Feb. 16, 1965 R. B. SIMS ETAL 3,169,422
TENSION LOOPER SYSTEM
Filed Sept. 28, 1961 8 Sheets-Sheet 1

INVENTORS
R.B. SIMS & B.I. BATHORY
BY
Henry C. Westin
THEIR ATTORNEY

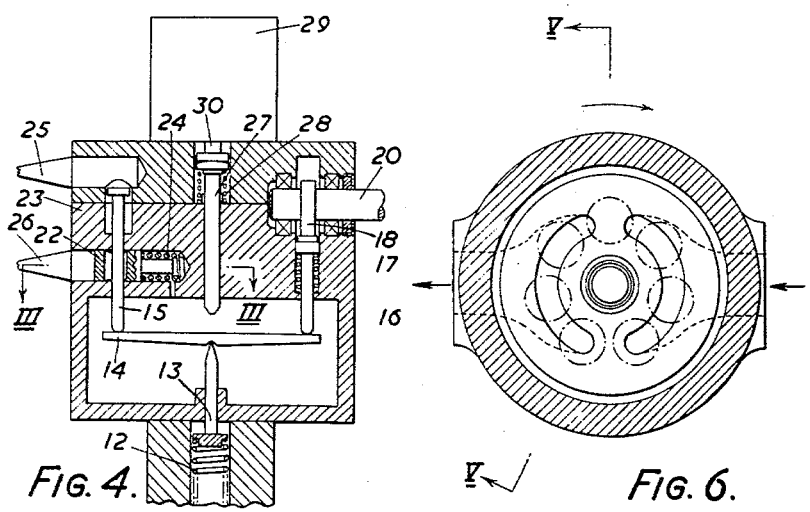
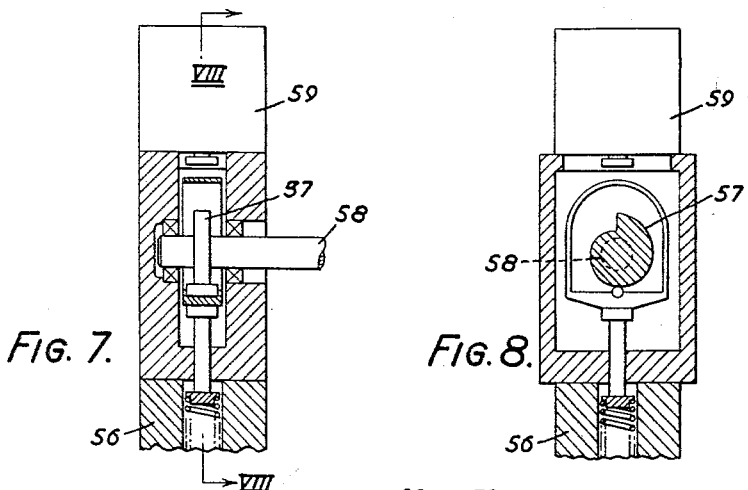
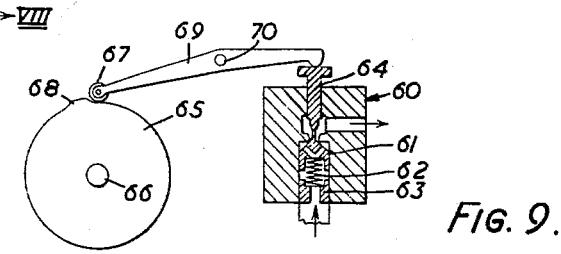

INVENTORS
R.B.SIMS & B.I.BATHORY
BY
Henry C. Westin
THEIR ATTORNEY

INVENTORS
R.B.SIMS & B.I.BATHORY
BY
Henry C. Westin
THEIR ATTORNEY

INVENTORS
R.B. SIMS & B.I. BATHORY
BY
THEIR ATTORNEY

United States Patent Office 3,169,422
Patented Feb. 16, 1965

3,169,422
TENSION LOOPER SYSTEM
Raymond Bernard Sims, Sheffield, and Bela Istvan Bathory, North Sheffield, England, assignors to Davy and United Engineering Company Limited
Filed Sept. 28, 1961, Ser. No. 141,475
Claims priority, application Great Britain, Sept. 28, 1960, 33,334/60; Apr. 6, 1961, 12,363/61
4 Claims. (Cl. 80—35)

This invention relates to detection and/or control, and is more particularly concerned with determining tension by the use of loopers in elongate material moving through multi-stand rolling mills. By the term "looper" is meant a mechanism including a looper roller which is forced against the material moving between two stands of a mill, and which affects the interstand tension of the material by altering the size of the loop formed therein.

Preferred forms of loopers for use with the present invention are described in detail in co-pending U.S. patent application Serial No. 73,162, filed December 1, 1960, this application has a common assignee with the present application.

The invention has various aspects which generally fall within the two general classes indicated above, namely tension detection or measurement, and tension control. However, these two broad functions will frequently be closely associated within a single apparatus or overall operating process, and it is convenient to consider the invention by way of preferred modes for the present purpose. It will of course be appreciated that these modes, to be described by way of particular exemplary embodiments hereinafter, are not intended to limit the scope of the invention which will be seen to be of considerable variation and flexibility in application.

In all of the particular embodiments to be described, use is made of a looper comprising a looper roller adapted to be forced against strip material moving between two successive stands of a continuous strip rolling mill, a pivoted arm on which the looper roller is freely mounted, a hydraulic cylinder for forcing the looper roller against the strip, and a hydraulic pump arranged to supply the cylinder with liquid under pressure through a controllable valve. The looper is also provided with a control system which, when energised, elevates the looper arm and roller from the fully down, or ambushed position, in which it does not engage the strip, to a predetermined position, which will be referred to hereinafter as the initial working position. The latter position is located between the fully down and fully up positions, and is such that the looper displaces the strip from its normal pass line, but does not increase the strip tension to any marked degree.

When the looper roller is elevated to this working position, the control valve is automatically closed to effectively seal the cylinder. This may involve isolating the cylinder from its supply pump or isolating the cylinder from a main supply while allowing an auxiliary supply to take effect. The latter operation is concerned with an advantageous feature to be described subsequently.

In a first mode of the invention, the looper acts as a tension meter to measure strip tension following the above operation with the looper elevated to the initial working position in response to a first predetermined supply pressure, the pressure in the cylinder after effective sealing indicating strip tension. This first mode also makes use of an emergency strip storage function whereby in the event that the latter pressure falls to or beyond a predetermined low value, the looper is operated at a second predetermined pressure lower than the initial elevating pressure and of the same order as the predetermined low value. This function results in the temporary storage of strip to avoid excess loop formation and the possibility of cobbling, pending appropriate mill adjustment by the operator.

The remaining modes of the invention employ a comparison between a preselected pressure and the cylinder pressure after effective sealing, and subsequently the looper is operated in accordance with such comparison. This subsequent operation of the looper may follow balancing between the two pressures involved in the comparison either in the sense that the preselected pressure is adjusted to balance the cylinder pressure after sealing, or vice versa.

The former of the above balancing operation is employed by a second mode according to the invention, whereby the looper may thereafter be employed as a free floating tension meter. Also, this second mode may employ a feature which will be referred to as a stiffness control whereby the looper operating pressure is automatically adjusted to compensate for any pressure difference not accounted for by balancing and to take account of subsequent tension variations.

This second mode of operation may also be employed for automatic tension control to maintain the strip tension substantially constant at its initial thread value in response to looper position.

Since in this second mode the preselected pressure is to be adjusted it will be usual to employ the predetermined elevating pressure as the preselected pressure.

The alternative pressure balancing operation is employed by the present invention in a third mode which involves automatic tension control in response to looper position to maintain the tension at a predetermined value not necessarily, and usually not, the same as the initial thread value. In this case the preselected pressure corresponds to the desired tension.

Having indicated in general terms the modes of the invention, these will now be more particularly described, by way of example, for a clearer understanding of the invention. However, to avoid unduly interrupting the logical description of such examples, it is convenient to describe first, examples of control mechanisms and other individual elements suitable for use in the former examples. Thus, the drawings are as follows:

FIGURE 4 illustrates a modified form of such mechanism in similar manner to FIGURE 1;

FIGURES 5 and 6 are associated sections V—V and VI—VI of a fluid supply pump control mechanism;

FIGURES 7 and 8 are associated sections VII—VII and VIII—VIII showing a modified form of the latter mechanism;

FIGURE 9 illustrates a control mechanism for use in connection with an auxiliary fluid supply as referred to above.

Figure 1:
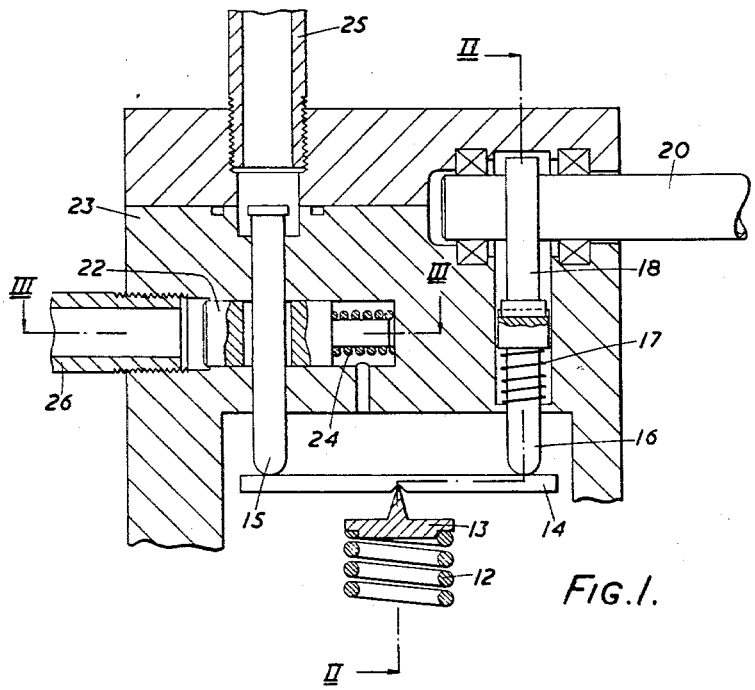
FIGURES 1 to 3 are related sections showing one form of control mechanism.
Figure 2:
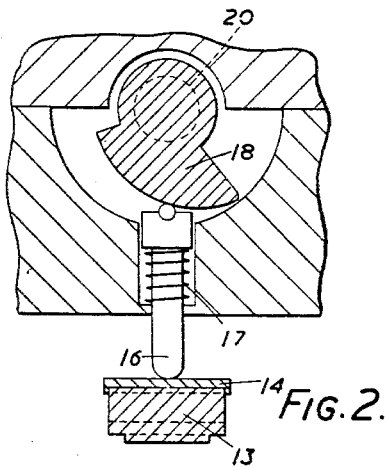
Figure 3:
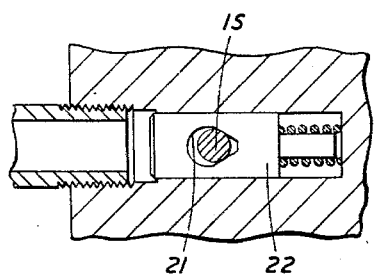
Figure 5:
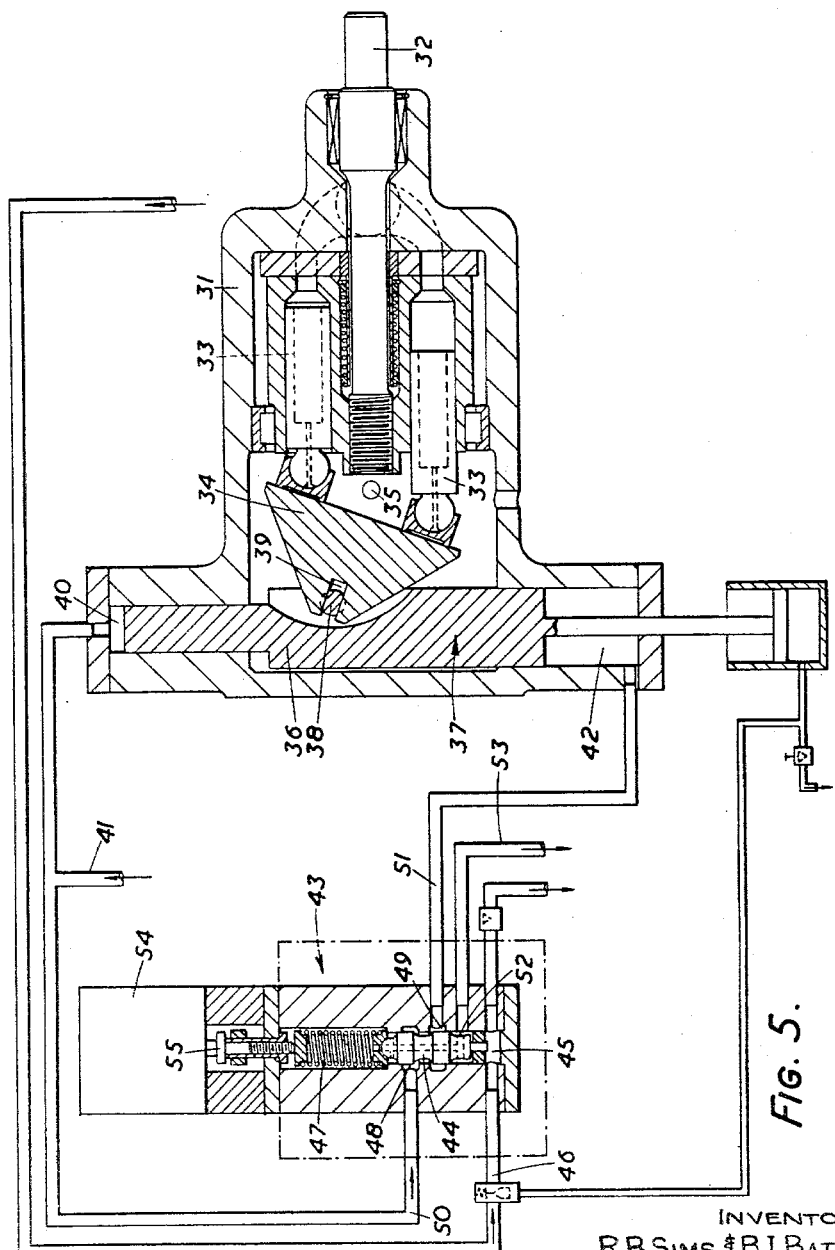

In FIGURES 1 to 3, the spring 12 applies spring force on a standard form of spool valve e.g. as shown at 43 in FIGURE 5, which in turn sets the pressure of the liquid delivered by the hydraulic pump, which has a variable delivery. At the end not engaging with the spool valve, the spring 12 abuts against a pointed plate 13 on which is pivoted a lever arm 14. Lever arm 14 is, in turn, engaged by two pistons 15, 16 on opposite sides of the pivot point. Piston 16 is biassed away from lever arm 14 by a spring 17, but its axial position is adjustable by a cam 18 mounted on a shaft 20.

Piston 15 passes through a wedge-shaped hole 21 in a further piston 22, which is slidably arranged in the block 23 and is biassed outwardly by a spring 24. Pistons 15, 22 are subject to the pressure of liquid supplied to pipes 25, 26 respectively.

In operation, the cam 18 is locked in position and the pipes 25, 26 are put into communication with the liquid in the looper main cylinder (e.g. as shown at 101 in FIGURE 5), after the cylinder has been sealed from the main pump supply. Normally, axial movement of piston 15 is prevented by the engagement of the walls of hole 21 with piston 15, in the manner shown in FIGURE 3. However, when liquid under pressure is supplied to pipe 26, piston 22 is forced to the right, as seen in FIGURE 1, against the action of spring 24 and releases piston 15 for axial movement. At the same time, the pressure of liquid in pipe 25 tends to force the piston 15 downwardly against opposition by spring 12 through the intermediary of the lever arm 14, so that lever arm 14 tilts with downward movement of piston 15 until the forces applied to lever arm 14 by piston 15 and spring 12 reach equilibrium. Next, pipe 26 is disconnected from the cylinder and vented to return, thus locking piston 15 in the new position. Lastly, pipe 25 is similarly disconnected from the cylinder and vented to return.

In this way, the force applied by spring 12 to the spool valve 43 is adjusted hydraulically and automatically to give an output pressure for the main pump supply which is identical, or proportional, to the pressure in the looper main cylinder after sealing from such supply, and when the cylinder is subsequently put into communication with this supply again, as described above in the second mode of operation, the main supply pressure is matched to the subsisting, or initial thread tension.

After piston 15 has been locked by the above adjustment, the main supply pressure may be further controlled by rotation of shaft 20 and cam 18 to depress piston 16 against the action of spring 12 via lever arm 14, or to allow this piston to rise. Such further control is employed for the stiffness control mentioned above in connection with the second mode according to the invention, and will be explained more fully hereinafter.

FIGURE 4 is a sectional view of a control mechanism similar to that described above with reference to FIGURES 1, 2 and 3 and corresponds to the view of FIGURE 1. The same reference numerals are used where appropriate and the modification of FIGURE 4 comprises the addition of a further piston 27 normally maintained in a raised inoperative position by the action of spring 28. However, a solenoid 29 is associated with piston 27, which is operative when energised to extend a plunger 30 and so depress the piston 27 against its spring 28.

The piston 27 is so located, and the extent of depression by energisation of solenoid 29 is such that the piston compresses the spring 12 of the spool valve 43 to a predetermined extent. This action at the same time depresses lever arms 14 out of contact with pistons 15 and 16, and so overrides any previous setting of these pistons.

FIGURES 5 and 6 show a variable delivery axial piston pump 31 of the kind more generally referred to as a swash plate pump. The pump is driven by suitable means such as an electric motor coupled to the pump shaft 32, and it will be seen that the rate of delivery of the pump depends upon the stroke of the pistons 33 of the revolving cylinder assembly, this stroke being determined by the angle of the cam plate 34 which is pivotable about on an axis 35. The angle of the cam plate 34 is determined by the position of the double-ended piston 36 of a servo-piston-and-cylinder assembly 37, the piston 36 carrying a pivot pin 38 which engages in a slot 39 in the cam plate 34.

The upper end of the piston 36 is of smaller area than the lower end thereof, and is subject to the pressure in a chamber 40 which is permanently connected to an auxiliary or pilot fluid supply 41 at a pressure of, say, 1,000 lbs./in.$^2$. The lower end of the piston 36 is subject to the pressure in a chamber 42, this pressure being determined by a valve 43 of a kind which will hereinafter be referred to as a spool valve.

The spool valve 43 has a spool 44 the lower end of which is subject to the pressure in a chamber 45 which is connected by means of a pipe 46, to the output of the pump 31, and the upper end of which is acted upon by a spring 47. The spool 44 is thus subject to a resultant vertical force equal to the difference between the upward pressure force and the downward spring force.

If the spring force exceeds the pressure force, then (as shown in FIGURE 5), the spool 44 tends to move downwards, providing communication between a valve ports 48 and 49 which are respectively connected to the pilot supply 41 by way of a pipe 50, and the chamber 42 by way of a pipe 51. The piston 36 is thus caused to move upwards, so increasing the angle of the cam plate 34 to increase the rate of delivery of the pump 31 and thereby the pump output pressure.

If the pressure force exceeds the spring force, then the spool 44 tends to move upwards to an extreme position where the port 48 is sealed off, and the port 49 is put into communication with a port 52 which is connected to a drain pipe 53. The chamber 42 of the assembly 37 is thereby connected to this drain pipe, and the piston 36 will thus move downwards to decrease the rate of delivery of the pump 31 and thereby the pump output pressure.

The spool valve is so arranged, that when the pressure and the spring forces are equal, the spool 44 will lie at a neutral position where the port 49 is sealed, so that the chamber 42 is also sealed and the piston 36 will remain stationary.

The connections of the spool valve 43 in these two extreme positions, and in the neutral position, are those shown for the spool valves in FIGURES 10 to 14.

Referring to FIGURE 5 again, the spool valve 43 is provided with a solenoid 54. When the solenoid is unenergised, its movable plunger 55 lies in the position shown in FIGURE 5, and does not appreciably compress the spring 47. When, however, the solenoid 54 is energised, the plunger 55 is forced downwards to compress the spring 47.

The spool valve 43 thus has two states of operation in the first of which the solenoid 54 is unenergised and in the second of which the solenoid is energised. The spring 47 is so chosen that, in the first state, the output pressure of the pump 31 is controlled by the spool valve to a low pressure of, say 300 lbs./in.$^2$, and, in the second state, the output pressure of the pump 31 is controlled by the spool valve to a high pressure of the order of, say, 3,000 lbs./in.$^2$.

FIGURES 7 and 8 illustrate, in part, a modified form of spool valve, reference 56, whereby the spring load may be varied in continuous manner by means of a cam 57. The angular position of the cam is controlled by a servo mechanism, for example by an electric motor coupled to cam shaft 58, the motor being controlled in turn by the electrical output of a selsyn or similar transmitter, or other suitable device. However, the spring load can also be controlled by a solenoid 59 which is effective, when energised, to override the cam control and set the valve to maintain the pump delivery pressure at a predetermined high value.

Figure 10:
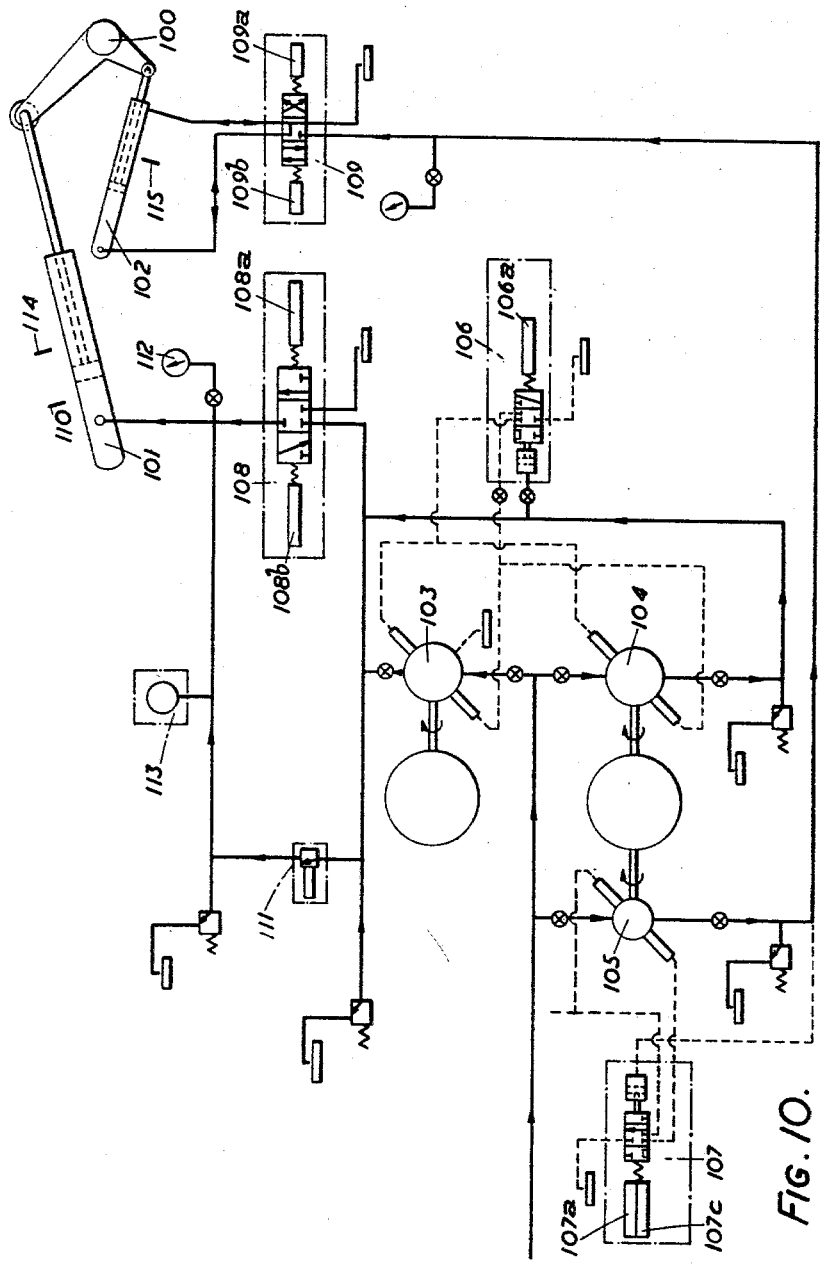
FIGURES 10–14 are schematic illustrations of control arrangements for the practical application of the invention in different operational modes.

FIGURE 10 illustrates apparatus for operation of a looper in accordance with a first mode, whereby an indication of interstand tension is made available to an operator. The apparatus also affords an emergency storage facility which is effective to reduce, and at the same time indicate, the possibility of loop or cobble formation in the event of loss of strip tension.

The looper roller and arm are not shown in this figure, but will be pivotable about the shaft 100 by actuation of a main hydraulic cylinder 101 and a balance hydraulic cylinder 102. It will be noted that the main cylinder is single-acting, whereas the balance cylinder is double-acting.

In the looper control circuit the fluid supply for the main cylinder is provided by one or both of pumps 103 and 104, depending on the range of strip tension anticipated, and these pumps are of the kind described with reference to FIGURES 5 and 6. A subsidiary circuit providing power for the balance cylinder is driven from a similar but smaller pump 105 which in operation maintains a pressure preset to substantially balance the moving parts of the associated looper and the weight of the strip between the two mill stands. This presetting may be effected in any suitable manner.

Initially the looper will be in ambush with respect to the strip, pumps 103 and 104 operate at the low pressure of, say, 300 lbs./in.² as determined by the spool valve 106, while pump 105 operates under the control of the spool valve 107 at the preset pressure mentioned above, spool valve 106 being of the kind described with reference to FIGURES 5 and 6, and spool valve 107 being of the kind described with reference to FIGURES 7 and 8.

When strip is threaded between the two stands, an initiating electrical signal is generated to energise the solenoids 106a and 107a of spool valves 106 and 107 and so transfer these valves to the second operative states mentioned above, in which each is effective to control the corresponding pump delivery pressure at predetermined high value, of the order of, say, 3,000 lbs./in.², At the same time, control valves 108 and 109 associated with the supply inputs to the main and balance cylinders, respectively are opened to first operative states by energisation of their solenoids 108a and 109a whereby the chambers adjacent the energised solenoids are operative to pass the fluid supplies. Fluid at high pressure is thus delivered to both the main and the balance cylinders. Thus the looper arm is raised against the interstand tension of the strip, and the strip is accumulated between the two mill stands to form a loop.

When the looper arm is elevated to the initial working position, the control valve 108 is closed to its neutral state by de-energisation of solenoid 108a in response to operation of a limit switch 110. Operation of the limit switch 110 also causes de-energisation of solenoid 107a of the spool valve 107; thereafter, the spool valve 107 will maintain the predetermined balancing pressure, as set by its cam in response to the setting of its selsyn transmitter, the latter control input being indicated at 107c. A packingless main cylinder is employed in order to reduce frictional errors, and so continuous leakage of fluid will occur from the main cylinder. After return of control valve 108 to its neutral position, an automatically adjusted, small position control valve 111 is used to compensate for such leakage, the valve 111 having negligible effect while the vale 108 is operated by energisation of the solenoid 108a. The supply through valve 111 constitutes an auxiliary supply as referred to above.

The valve 111 is operated in response to the position of a cam arranged to rotate with the shaft 100. The arrangement is such that with the looper in ambush the valve 111 is closed, while as soon as the looper is raised, valve 111 opens fully and remains so until the looper is nearly at the initial working position. Thereafter, any further rise of the looper causes the valve 111 to gradually close with the rise, so that an equilibrium state tends to be reached, in which the supply of fluid through the valve 11 to the main cylinder balances the leakage from that cylinder.

With the valve 108 in its neutral state, the looper thus tends to remain fixed in position.

The oil pressure in the main cylinder will vary as a direct function of strip tension, which pressure is measured by use of an electrical transducer or pressure gauge 112, for example, to give a visual indication of the actual strip tension.

It will be appreciated that since the opening of the valve 111 is dependent upon the angular position of the shaft 100 as described, the measured pressure will be substantially unaffected by the replacement of the fluid which leaks from the main cylinder 101. Thus, tension measurement is obtained with the main cylinder effectively sealed, but at the same time functional errors are reduced.

FIGURE 9 illustrates one example of a form of position control valve 60 siutable for the function of position control valve 111 above. This valve 60 comprises a sliding valve member 61 which is urged by spring 62 to close the fluid supply path through the valve, spring 62 being located between valve member 61 and a fixed valve member 63, as shown. The sliding valve member can be moved to open the fluid supply path through the valve 60 by depression of a plunger 64. During elevation of the looper, cam 65, the shaft 66 of which is drivably connected to the looper shaft 100, is rotated in a clockwise direction. Cam follower 67 thus engages the rise 68 of cam 65, rotates the lever arm 69 pivoted at 70, and so depresses the plunger 64 to open valve 60.

The cam 65 is shown in a position corresponding to an angle 0° with respect to looper arm elevation, and the cam rise 68 will be of suitable design to control the opening and closing of valve 60 in response to looper arm elevation in the desired manner as described above.

Returning to FIGURE 10 it will be seen that there is substntially no storage of strip by the looper at normal tensions and the system simply acts as a tension meter. However, if the rolling conditions change the interstand tension may fall, and if reduced to zero a loop in excess of that produced by the looper would form leading ot a cobble and the apparatus of FIGURE 10 is provided with an emergency storage function for this reason.

When the pressure in the main cylinder falls below a predetermined minimum value of the order of that with the pumps operating at low pressure, namely 300 lbs./in.² in the above example, a pressure switch 113 operates to de-energise solenoid 106a and so to reset spool valve 106 to its first state for the low pressure pump operation. Operation of pressure switch 113 also energises solenoid 108a to open control valve 108 once more and so supply fluid to the main cylinder at the latter pressure. The looper roller will then rise since it will apply a tension to the strip slightly in excess of the interstand value, and so stores strip to avoid loop formation. When the looper arm reaches its maximum elevation it closes a second limit switch 114, which is operative to deenergise solenoid 108a and so close the control valve 108 to prevent further rise of the looper arm.

It will be appreciated that the looper has no automatic function in this first mode of operation: the pressure variations indicated at 112 and the emergency rise of the looper at low tension serve to indicate to the mill operator that adjustment of the mill is required to restore strip tension, and the operator must take appropriate action. In addition, it is desirable to include an alirm device in the apparatus which is energised on closure of the second limit switch 114.

On appropriate adjustment of the mill, the strip tension will increase to a value greater than that equivalent to a pressure of 300 lbs./in.² in the main cylinder, so that the looper will be depressed from its maximum position. When this occurs limit switch 114 opens, also opening control valve 108 by energisation of solenoid 108a and so reconnecitng the main cylinder to fluid supply at 300 lbs./in.² pressure.

If the looper arm continues to be forced downwards and reaches the first limit switch 110, then the valve 108 is returned to its neutral position once more so that the pressure gauge 112 again indicates strip tension, and the spool valve 106 is reset to control pumps 103 and 104 for operation at the pressure of 3,000 lbs./in.² by energisation of solenoid 106a.

As the end of the strip approaches the two mill stands in question, an electrical signal is automatically generated upstream from the looper, and is operative to reset spool valve 106 from its maximum operating pressure of 3,000 lbs./in.² to its predetermined low pressure supply value of 300 lbs./in.². At the same time this signal gives rise to energisation of solenoid 108b to open control valve 108 to a second operative state with its left hand chamber operative to connect the main cylinder directly to tank, and simultaneously gives rise to energisation of solenoid 109b to open control valve 109 to a second operative state with its left hand chamber operative to supply fluid to the other end of the balance cylinder and to connect the normal cylinder supply line to tank. The balance cylinder is then operative to drive the looper down into ambush, with the assistance of gravity, exhausting the main cylinder of fluid as it does so. At the end of its downward travel the balance cylinder closes a third limit switch 114, which is then operative to reset control valves 108 and 109 to their neutral positions.

The apparatus is thus prepared for a further control cycle when the next coil of strip enters the mill.

It will be seen that by this first mode of operation a mill operator can maintain a safe working interstand strip tension, since he is provided with a direct indication of the actual strip tension during a normal operation, and is given additional warning of loss of strip tension, the apparatus providing an automatic temporary storage facility for strip in the latter circumstances.

Hot strip mills are normally fitted with looper mechanisms driven from a torque motor, the torque output of which is constant with shaft rotation. The tension exerted on the strip by the looper roller, however, depends on the angular position of the looper roller and tension exerted is a substantially non-linear function of the angular position. In these conventional electric looper equipments, when the looper roller is floating freely, a mis-match in speed between the two adjacent stands can, under a certain set of circumstances, be self-correcting and stable. If, for example, the two stands are out of speed balance in such a way that the loop between the two stands tends to decrease, then the looper arm is forced downwards by the decreasing loop of strip material. If the looper arm elevation is less than approximately 50°, a decrease in the looper angle will, for a constant torque exerted on the looper arm shaft by the torque motor, increase the tension applied to the strip by the looper arm. Thus as the strip forces the looper arm down, the tension exerted on the strip by the looper arm is increased. The effect of increasing tension on strip material changes both the forward and backward slip in the two adjacent mills and, if the speed mis-match between the two stands is not great, this change in forward slip can give an adequate speed correction to the strip so that the loop ceases to be diminished.

Thus when using the older types of electric looper equipment, the mill operator has an indication by the change of looper angle, of an unbalance in the speed adjustment of the two stands, and this indication has the advantage of storing the strip material and for small changes in speed it is inherently stable. The objections to the conventional looper, however, still remain; it is not easy to provide the operator with an indication of strip tension, and because of the non-linear characteristics of the looper arm itself, it is not easy to provide means for automatic adjustment of tension by means of a closed loop regulator. Moreover, a fast acting regulator cannot be provided in practice because it requires a very large and cumbersome electric motor.

Figure 11:
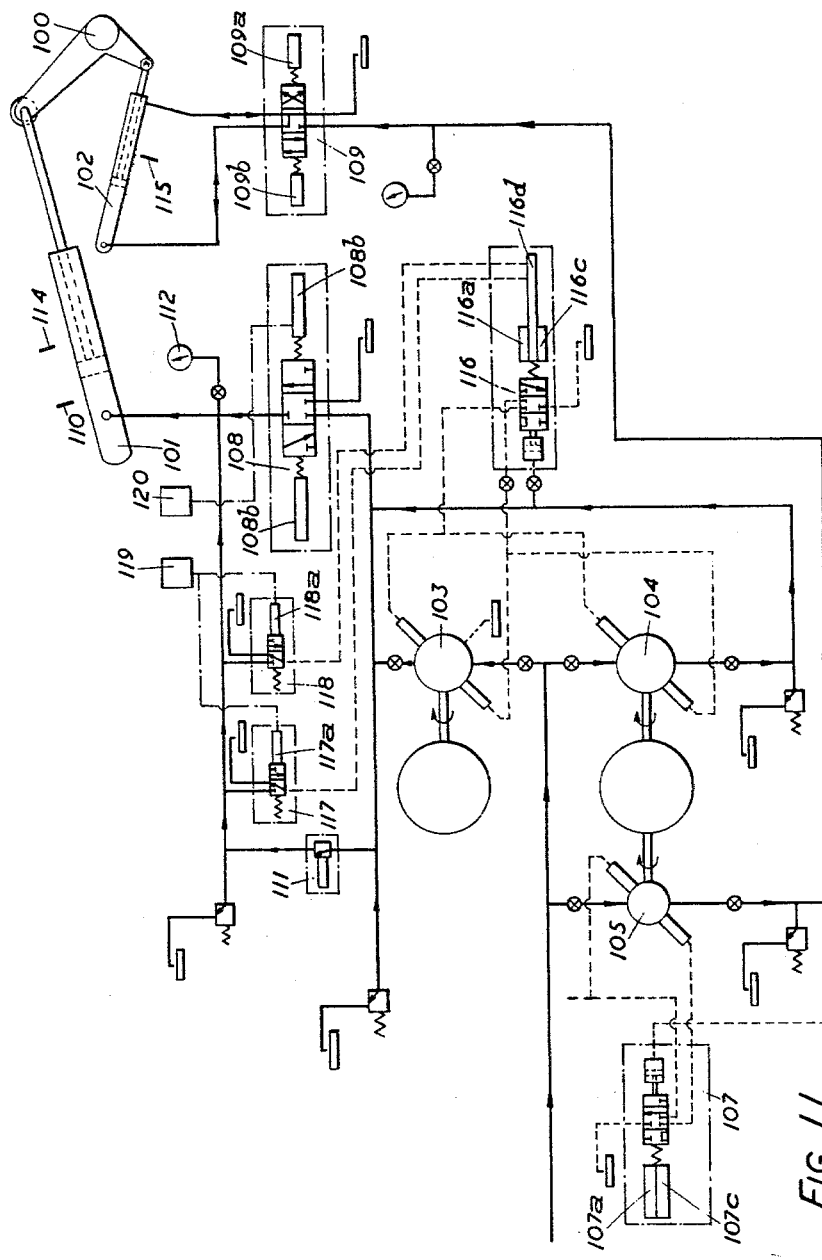

Modified apparatus whereby such difficulties are obviated is illustrated by FIGURE 11, this apparatus being designed for operation in a second mode.

It will be seen from FIGURE 11 that in fact relatively little modification is required from FIGURE 10, and this comprises substitution of a double function integrating spool valve 116 of the kind described with reference to FIGURE 4 for control valve 106, and the introduction of two further control valves 117 and 118 associated with valve 116. The operational sequence with the apparatus of this figure is the same as that for FIGURE 10 up to the point where the valve 108 is returned to its neutral position with the looper elevated to its initial working position, and operation of limit switch 110.

Thereafter, limit switch 110 de-energises solenoids 116a and 107a of the spool valves 116 and 107, and also energises two variable delay switches 119 and 120, the first of which in turn energises solenoids 117a and 118a of the valves 117 and 118. Referring for the moment to FIGURE 4 in addition to FIGURE 11, the second of these valves 118, then supplies fluid to pipe 26 to release piston 15 in the integrating valve 116, and the first of these valves 117 connects pipe 25 to the main cylinder 101. The pressure developed at this point in valve 116 is then directly proportional to the tension in the strip, namely the thread tension.

When limit switch 110 returns control valve 108 to its neutral position it de-energises the solenoid 116a of valve 116 so that the corresponding solenoid-operated piston 27 is elevated by spring 28 to its maximum height from the centre of the valve. The piston 15 which is directly connected to the pressure in the main cylinder then determines the force on the spool valve spring 12 through the lever arm 14, the right hand cam adjusted portion of the lever system being fixed at that time.

As a result of the above balancing action, the pump will deliver pressure very similar to that in the main cylinder, and this action may be initially adjusted so that the error between pump pressure and main cylinder pressure will not exceed 5%, for example. The variable delay switch 119 closes control valves 117 and 118 at a predetermined time, of the order of 1 second say, after they are opened, and the circuit will be so arranged that valve 118 closes before valve 117. Immediately thereafter, the variable time delay switch 120 operates to re-open control valve 108 and so connect the main cylinder to the now modified pump supply.

If there is not exact coincidence between the pump pressure and the main cylinder pressure, the looper will be forced to move upwards or downwards according as the former pressure exceeds the latter or vice versa. This could lead to a degree of instability, and account is taken of this by the integrating spool valve operating in its second function to introduce a degree of "stiffness" into the system at this point. A position sensing device such as a selsyn transmitter is coupled through gearing to the output shaft 100 of the looper, and in turn it rotates the shaft, again through suitable gearing, which drives the cam 18 (FIGURE 4) of the integrating spool valve 116. The movement of the valve cam compresses or relieves the main spring 12 (FIGURE 4) of valve 116 depending on the looper movement, that is, the sense of unbalance between the pump and main cylinder pressures. At this time the hydraulic balancing system comprising control valves 117 and 118 is locked, so that the left hand side of the integrating valve lever system now acts as a fulcrum. The design of the cam may be chosen to impose an adjustment of the fluid supply pressure to the main cylinder which depends directly upon the angular deviation of the looper arm from its initial working position, or in any other desirable manner.

Thus, if the strip thread tension is 10,000 lbs., for example, and after initial adjustment of the integrating valve by action of valves 117 and 118 to balance the main cylinder supply pressure with strip tension, the main cylinder supply is still different, at 9,500 lbs. say, then appropriate design of the integrating valve cam may result in 1,000 lbs. increase of cylinder supply pressure for each 5° decrease of the looper arm. It will be seen that the looper will then float about a mean elevation which is 2½° less than its initial working position for the nominal strip tension of 10,000 lbs., and pressure gauge 112 shows the actual tension.

Should the strip tension change significantly due to changes in rolling conditions, this is shown both by pressure gauge 112 and the looper position, and the operator must make suitable adjustment of the mill to restore tension towards the value which corresponds to the pressure attained during the balancing process mentioned above. The looper will thus automatically return to its initial working position. Should the looper rise to its maximum position, limit switch 114 will operate as described with reference to FIGURE 10.

The return of the looper to ambush at the end of a coil will be effected in the same manner as with the apparatus of FIGURE 10.

In a modified form of the above arrangement, the mill may be adjusted automatically in response to variation of the looper arm position and maintain the strip tension substantially constant at its initial thread value. This automatic control will be initiated after final balancing of the main cylinder pressure against strip tension, that is when the looper floats. Any subsequent change of rolling conditions will give rise to change in looper arm angle, and this will be effective to automatically adjust the mill roll speeds in appropriate manner. Thus, if the length of the strip being stored between the stands is decreasing, the outgoing strip speed may be decreased and/or the ingoing strip speed increased.

In practice, the null position for the looper arm angle will be chosen as the initial working position. It will be noted from the above description that by appropriate design and adjustment the pressure discrepancy after initial balancing may be maintained within 5%, for example, so that this applies equally to the initial error signal.

Return of the looper to ambush and resetting of the control arrangements will not differ significantly from that of the previous two arrangements above.

In the case of fully automatic strip tension control, whereby the strip tension is maintained substantially at a preselected value which is not necessarily, and in fact will usually differ from, the thread value, it will be seen that difficulty may arise. This difficulty is that of a significant difference existing between the preselected main cylinder pressure, corresponding to the desired strip tension with the looper in its initial working position, and that due to the strip thread tension. If the preselected applied pressure is too small the looper will return to ambush, while if that pressure is too large the looper will be rapidly driven to maximum elevation and may cause instability in the system.

Figure 12:
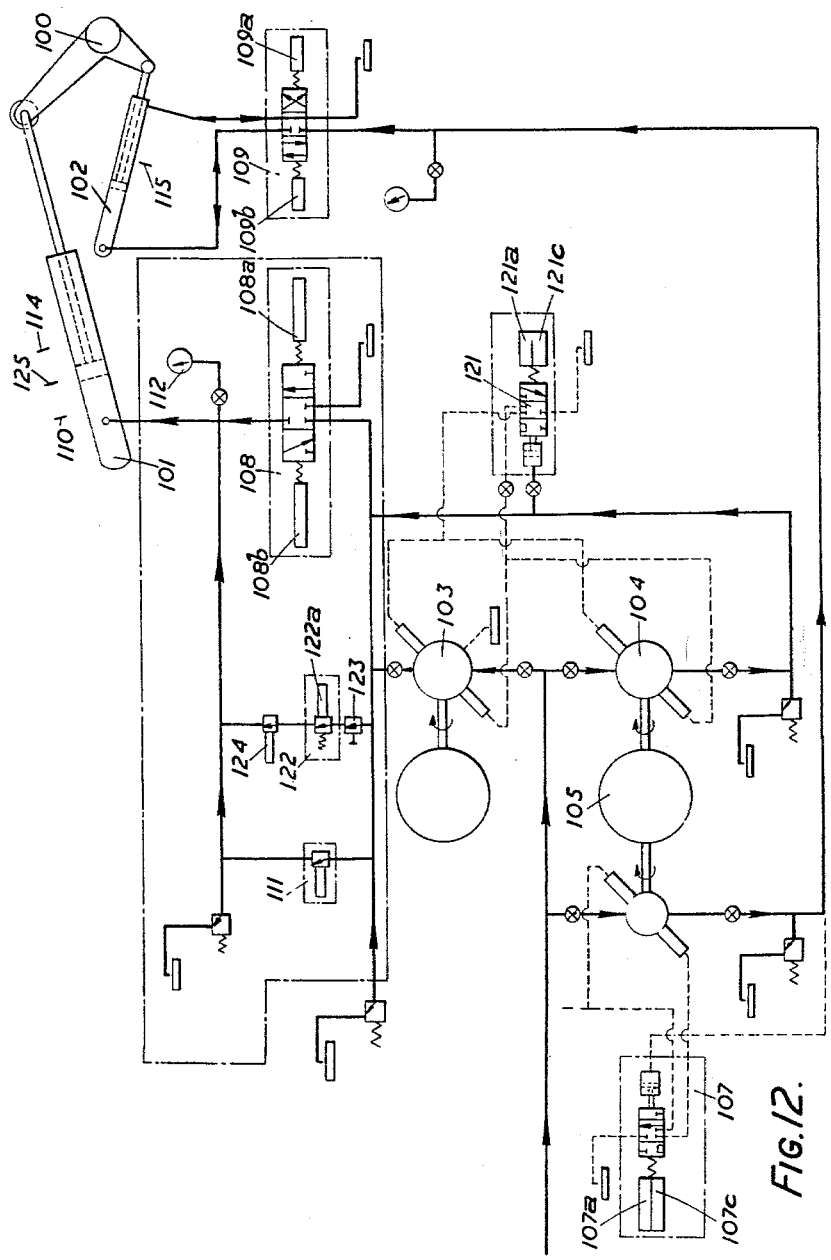

FIGURE 12 illustrates apparatus for operation in a third mode whereby such difficulty is avoided. The initial operation of such apparatus is similar to that described above, except that in this instance the main cylinder spool valve 121 is now of similar form to that employed for the balance cylinder of FIGURES 10 and 11.

The operator sets the desired interstand tension at his control station, and spool valve 121 serving the main cylinder pumps is thereby set at 121c for delivery of the corresponding, that is, the preselected, pressure, by means of a selsyn transmitter and receiver, for example. Before strip enters the mill, therefore, pumps 103 and 104 are producing the appropriate preselected pressure, but at zero delivery. However, when the strip enters the mill, spool valve 121 is automatically set by energisation of solenoid 121a to apply fluid at predetermined pressure for elevation of the looper to its working position, this pressure being 3,000 lbs./in.² as above, for example. This action overrides the selsyn system setting to elevate the looper until limit switch 110 operates.

Operation of the latter switch returns control valve 108 to its neutral position, and at the same time solenoids 107a and 121a are de-energised to cause the spool valves 107 and 121 to be controlled by the selsyn transmitters 107c and 121c respectively. Thus the pumps 103, 104 and 105 are caused to deliver fluid at the preselected pressure to the main cylinder in respect of the desired interstand tension on the one hand, and at predetermined pressure to the balance cylinder to balance the interstand strip weight and looper weight on the other hand.

Limit switch 110 is also operative, by energisation of solenoid 122a, to open valve 122 which is connected in series with a cam-operated valve 124, operated in accordance with the angular position of the looper shaft 100 as described below, and with a manually settable needle valve 123 for fine adjustment, and is also operative to set in operation an automatic mill adjustment system in response to looper elevation. The valve 122 is normally effective to allow fluid to be taken from or supplied to the main cylinder depending on whether the pressure in the main cylinder with control valve 108 in its neutral position is greater or less than that developed by the preselected pump supply. Thus, the looper will rise or fall slowly, the rate of rise or fall being determined by the setting of the needle valve 123, the valve 124 being normally open. The automatic mill adjustment is initiated simultaneously, with a null corresponding to the initial working position of the looper. Adjustment of roll speed, or speeds may be made as with the previous apparatus in response to looper arm angle and so will commence with zero error signal. It will be seen that the looper arm angle changes from its initial working position by the action of valves 122 and 123 in compensating any pressure difference, while at the same time a corresponding error signal builds up to change the rolling conditions in the correct sense to restore the looper to its initial working position, with the preselected strip tension. Clearly, the time available in which to obtain equilibrium may be adjusted via the fine adjustment valve 123. The cam-operated valve 124 is designed to close when the looper arm descends through an angle of, say, 5° below its initial working position; thus, under the conditions where the pressure in the main cylinder 101 is considerably greater than the pump supply pressure, the rate of escape of the fluid from the main cylinder 101 is intended by this means to be sufficiently reduced to prevent the looper arm from descending more rapidly than can be accommodated by the corrective action of the automatic mill adjustment. Should, however, the looper arm descend to, say, 10° below the initial working position, then the cam-controlled valve 111 will close in addition, and further reduce the rate of descent.

When the preselected strip tension is obtained, this being detected by pressure gauge 112, and being necessarily attained within a fixed time, control valve 108 is operated by energisation of solenoid 108a to connect the main cylinder to the fluid supply at the pressure preselected by the operator and the looper will float freely.

In practice, it may be appropriate to provide a "dead" zone for the automatic looper position mill control whereby no error signal is generated for variation of the looper position within a small angle on either side of the null position. In this case the latter control system will still commence operation on its own with zero error signal, provided that the combined effects of main cylinder pressure equalisation and looper position control are sufficiently efficient to counteract any significant change in looper position before opening of control valve 108 by energisation of solenoid 108a.

In a modification of the arrangement of FIGURE 12, the valve 124 is omitted, and a further limit switch 125 is provided intermediate the limit switches 110 and 114, this further switch being arranged to close valve 122, by de-energisation of its solenoid 122a, when the looper arm descends by, say, 5° below its initial working position.

Figure 13:
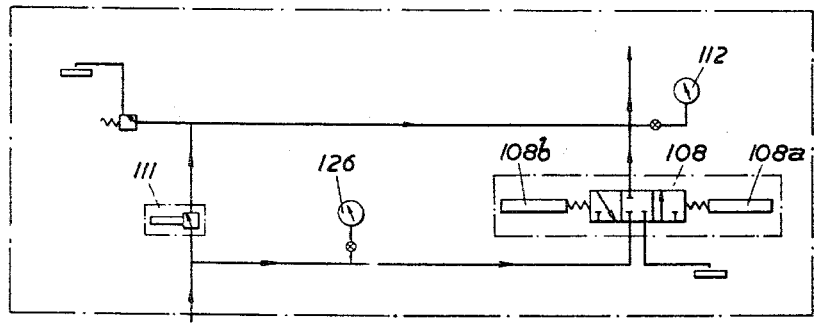

FIGURE 13 represents a modification of part of the apparatus of FIGURE 12, which gives rise to an alternative third mode of operation and which in some respects is to be preferred.

The operation with this apparatus is the same as that for FIGURE 12 up to the point where limit switch 110 operates to return valve 108 to its neutral position and initiate the looper position control. However in this case the automatic control system receives an error signal not in response to the looper position in the first instance, but in response to the pressure differential between that in the main cylinder resulting from strip tension and that preselected by the operator for the supply from pumps 103 and 104 at stall valve 121. This pressure difference signal is produced by use of two pressure transducers 112 and 126 connected in the different pressure lines concerned, as indicated. Dependent on the magnitude and sense of any pressure difference, so the error signal will correspond and be operative to adjust the roll speeds until the error signal is substantially zero. At this time the strip will be at the desired tension and the looper at its initial working position, and the control valve 108 is opened by energisation of solenoid 108a and control is switched to operation involving use of the looper position error signal, so allowing the looper to float freely.

In the above arrangement of FIGURE 13, the pressure difference signal derived from the two pressure transducers 112 and 126 is employed to adjust the main cylinder pressure until it is substantially equal to the output pressure of the pumps 103 and 104. In a further arrangement the two pressure transducers can be employed to adjust the output pressure of the pumps 103 and 104 until this pressure is substantially equal to the main cylinder pressure. Thus, this alternative arrangement gives rise to automatic tension control to maintain strip substantially at the thread tension as in the case of FIGURE 11. This further arrangement may be considered as derived from that of FIGURE 11 in the following manner: control valves 117 and 118 and delay switches 119 and 120 are omitted, spool valve 116 is replaced by a spool valve of the form of spool valve 121 of FIGURE 12 capable of being controlled by a servo mechanism such as the selsyn transmitter 121c, and a pressure transducer similar to 126 of FIGURE 13 is connected to the output of the pumps 103 and 104.

The latter arrangement operates similarly to that of FIGURE 11, but in this case the pressure difference signal derived from the two pressure transducers 112 and 126 is employed to control the servo mechanism which controls the angular position of the cam 57 (FIGURES 7 and 8) of the spool valve 121. The arrangement is such that the cam 57 is caused to rotate until the output pressure of the pumps 103 and 104 is substantially equal to the main cylinder pressure. When such pressure equalisation has been achieved, the solenoid 108a of the control valve 108 is energised to connect the main cylinder to the pumps 103 and 104. Thereafter the angular position of the cam 57 is controlled by the servo mechanism, which is in turn controlled by the angular position of the output shaft 100 of the looper. The output pressure of the pumps 103 and 104, and thus the main cylinder pressure, is thus made dependent, either directly or in any other desired manner, upon the angular deviation of the looper arm from its initial working position.

One of the principal features of the above automatic control systems is that the ultimate, and in fact the working error signal, as distinct from what may be regarded as preparatory signals, represents the displacement of the looper arm from a predetermined position and in practice is employed to control the speed of at least one of the mill stands in the train concerned. This error signal is, therefore, a function of the length of the strip stored in the loop, and, from the control point of view at least, the mill speed signal may be regarded as a function of the rate of change of storage in the loop. Under other circumstances, the use of the looper arm to derive an error signal introduces a stage of integration into the control circuit which would make stabilisation difficult if the speed control were initiated with a large error signal: however, in the above arrangements for automatic control this difficulty is avoided by the introduction of pressure equalisation, in various ways. In each case when looper position control becomes effective, the error signal is substantially zero.

Figure 14:
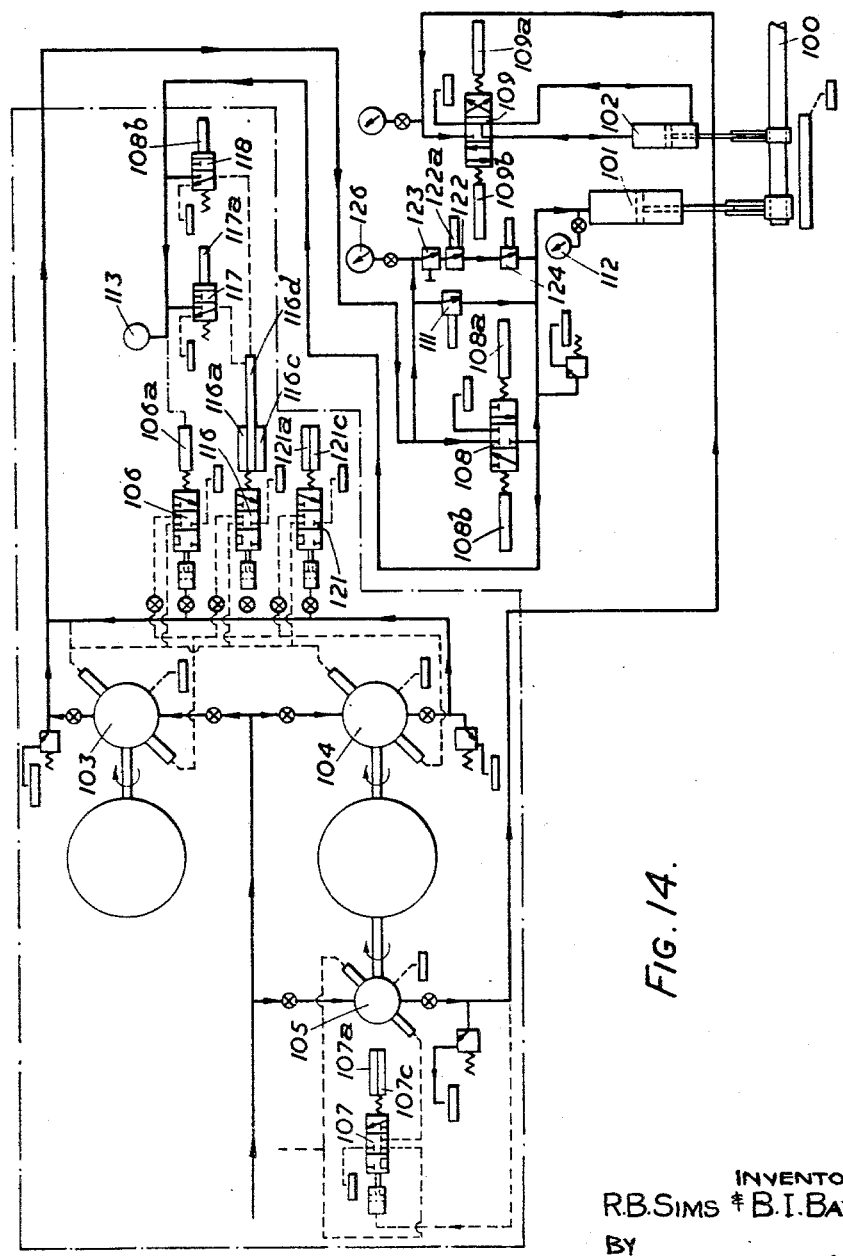

FIGURE 14 illustrates apparatus for a comprehensive control system, which provides the facilities of the apparatus of FIGURES 10 to 13.

Although the invention has been described in its different aspects by reference to specific control arrangements, it will be appreciated that modified forms of control apparatus may be employed for the same purposes without departing from the scope of the invention.

Also it will be appreciated that, although by virtue of the use of a packingless main cylinder 101 and the consequent provision of a compensating fluid supply therefor by way of position control valve 111, closure of valve 108 does not necessarily isolate cylinder 101 from pumps 103 and 104, this is only illustrative of one aspect of the present invention. In another aspect, where a main cylinder is employed which can be sealed, closure of valve 108 will isolate that cylinder from pumps 103 and 104. The above examples of FIGURES 10 to 14 then illustrate different modes of operation in such a case by omission of position control valve 111 and the fluid supply path therethrough.

In accordance with the provisions of the patent statutes, we have explained the principle and operation of our invention and have illustrated and described what we consider to represent the best embodiment thereof. However, we desire to have it understood that within the scope of the appended claims, the invention may be practiced otherwise than as specifically illustrated and described.

We claim:

1. A method of operating a looper engageable with moving elongate material including a looper actuating fluid pressure means, the method comprising the steps of; supplying said pressure means with fluid at a first predetermined pressure, effectively sealing the pressure means when the looper is at a selected position whereby the pressure in the pressure means indicates the tension of said elongate material, and in the event that the latter pressure falls to or beyond a predetermined low value, supplying said pressure means with fluid at a second predetermined pressure lower than said first predetermined pressure and of the order of said low value.

2. Apparatus for operating a looper engageable with moving elongate material including a looper actuating fluid pressure means, comprising means for supplying fluid to said pressure means at a first predetermined pressure to operate said looper, means for effectively sealing said pressure means in response to the looper attaining a selected position, and means for supplying fluid to said pressure means at a second predetermined pressure in the event that the pressure in said pressure means falls to or beyond a predetermined low value, said second pressure being lower than said first pressure and of the order of said low value.

3. Apparatus for operating a looper engageable with moving elongate material comprising a fluid pressure cylinder for actuating said looper, fluid supply means for said cylinder, means for controlling said fluid supply means to supply fluid to said cylinder at a first predetermined pressure, means for substantially isolating the cylinder from said supply means when the looper attains a selected position after actuation at said first pressure, and means connected to and for controlling said fluid supply means to supply fluid to said cylinder at a second predetermined pressure in the event that the pressure in said cylinder falls below a predetermined low value, this second pressure being lower than said first pressure and of the order of said low value.

4. Apparatus for operating a looper engageable with moving elongate material comprising a fluid pressure cylinder for actuating said looper, fluid supply means for said cylinder, means for controlling said fluid supply means to supply fluid to said cylinder at a predetermined pressure, means for substantially isolating said cylinder from said supply means when the looper attains a selected position after actuation, means connected to and for controlling said fluid supply means to supply fluid at a preselected pressure after substantial isolation of said cylinder, means for comparing said preselected pressure with that in said cylinder after substantial isolation, means for adjusting one of the compared pressures to obtain substantial equality therebetween, and means for reconnecting the cylinder to said fluid supply thereafter.

References Cited by the Examiner
UNITED STATES PATENTS

| | | | |
|---|---|---|---|
| 2,215,329 | 9/40 | Lessmann | 80—35.1 |
| 2,223,718 | 12/40 | Cook | 80—35.1 |
| 2,249,839 | 7/41 | Lessmann | 80—35.1 |

WILLIAM J. STEPHENSON, *Primary Examiner.*

LEON PEAR, *Examiner.*